United States Patent [19]
Damkjaer

[11] Patent Number: 4,754,872
[45] Date of Patent: Jul. 5, 1988

[54] CONVEYOR CHAIN LINK

[76] Inventor: Poul E. Damkjaer, Markvangen 20, DK-7100 Vejle, Denmark

[21] Appl. No.: 9,295

[22] Filed: Jan. 30, 1987

[30] Foreign Application Priority Data
Jan. 30, 1986 [DK] Denmark ................ 468/86

[51] Int. Cl.$^4$ ........................... B65G 17/06
[52] U.S. Cl. ............................ 198/852; 198/850; 198/851
[58] Field of Search ............. 198/850, 851, 852, 831, 198/855

[56] References Cited
U.S. PATENT DOCUMENTS
3,285,394 11/1965 Lanham et al. ........... 198/851 X
4,276,980 7/1981 Oizumi ..................... 198/853 X
4,645,070 2/1987 Homeier .................. 198/852 X Primary Examiner—Robert J. Spar
Assistant Examiner—Jennifer Doyle
Attorney, Agent, or Firm—Antonelli, Terry & Wands

[57] ABSTRACT

A conveyor chain link with ribs on the load-bearing side has the ribs designed substantially parallel and extending in the direction of travel and comprising two connected parts being offset relative to each other by one rib width, and has the ribs designed with different overall lengths so that the outer ribs have the greatest overall length and decreasing length towards the center rib being the shortest. Some of the rib ends have an oblique cut by a vertical, plane cut at an angle of about 11½°. The cut is greatest at the outer ribs and decreasing towards the center.

10 Claims, 3 Drawing Sheets

CONVEYOR CHAIN LINK

The present invention relates to a conveyor chain link provided with ribs on a load-bearing side, with upper edges of the ribs forming a bearing surface, and the ribs being arranged substantially parallel extending in a direction of travel of the conveyor, and with each chain link including two mutually offset connected parts whereby the ribs of the following chain link may protrude or extend partly into spaces between the offset rib parts, and also with the chain link having linking parts and parts for guiding the chain link in slide rails.

A number of different types of conveyors formed by a plurality of uniform chain links have been proposed with some of the conveyors having ribs disposed on an upper side thereof. Ribs are utilized since it is desirable that they be able to carry objects to and from the conveyor by a dead plate with fingers extending between the ribs.

A conveyor of the aforementioned type is proposed in, for example, U.S. Pat. No. 4,153,152, wherein each chain link consists of two hinged base parts with one part being provided with ribs having a center offset and neighboring chain links can be linked by the hinge structure which is movable perpendicularly to the former so as to create a cardan-joint chain.

A disadvantage of the above proposed construction and similar constructions reside in the fact that the constructions are very complicated since it is desirable and necessary that the conveyor be capable of moving in a straight as well as curved path.

A further disadvantage of the proposed construction resides in the fact that they do not provide a possibility of obtaining a particularly stable chain surface since there is a fairly great distance between the ribs in order that the chain can be moved along curved paths and because fairly large openings occur in the surface upon turning or curving so that the proposed type of conveyors can only be used for conveying comparatively big objects. In this connection, if the proposed conveyors were used for small objects, rib conveyors are generally solely adapted to run along a straight path and changes of direction must be made in another manner.

It is the object of the invention to provide a conveyor chain link with ribs on the load-bearing side where it is possible with a number of uniform chain links to build up a highly flexible conveyor with a view to movability and running in curves while simultaneously obtaining a very stable chain surface.

According to the present invention, a conveyor chain link is provided wherein an overall length of each rib is different so that the outermost ribs have the greatest overall length, and where the length decreases towards the center rib being the shortest rib in that the rib ends forming a front edge of the chain link and extending from the center rib toward one of the outer ribs have decreasing thickness, and the rib ends forming the outer front edge and extending from the center rib toward the outer rib have a decreasing thickness.

By virtue of the above noted features of the present invention, even with a turn of a radius of, for example, 190 mm, no openings will occur in the chain surface so that it is possible without difficulty to use turning wheels with bearings whereby the increased friction by turning the chain is avoided.

Moreover, with the present invention, it is possible to make the ribs from one chain link reach quite far in between the ribs of the following chain link thereby providing a stable chain surface when the chain passes a small turning wheel. Furthermore, there will occur no openings with a curve in the chain surface which are wider than a distance between the ribs, that is, the conveyor may be used for conveying fairly small objects.

As can be appreciated, it is possible to construct the conveyor chain link in accordance with the features of the present invention for ordinary conveyor chains as well as for cardan conveyor chain links which include an integral cardan joint as a linking means between the individual chain links.

By providing a conveyor chain link wherein the distance between neighboring ribs is substantially twice a width of a rib and the offset between the rib parts being substantially equal to one rib width, it is possible to provide room at the end of the conveyor for a dead plate with fingers engaging the chain, and there is additional room for also mounting a driven roller with ring-shaped ribs in the dead plate itself so that even the small objects will never stop on the dead plate. This is of extreme importance when a definite number of objects must be carried forward and, for example, subsequently counted.

In order to obtain a uniform friction over the entire conveyor breadth, in accordance with further features of the present invention, all the ribs have substantially the same width.

In order to provide for rib lengths which always ensure, even utilizing very small turning wheels, that no undesired openings in the chain surface will occur, advantageously, according to the present invention, a difference between a length between neighboring ribs is in a range of 4–8% of the rib length.

Preferably, according to the present invention, a reduction of thickness of the rib ends is made on a side of the ribs facing the center rib by a vertical plane cut in an angle of between 8–14 degrees relative to a direction of travel of the conveyor chain link whereby none of the ribs of the chain link touches the ribs of the following chain link even when turning by a minimum radius where the innermost ribs engage each other deeply.

In order to obtain a stable chain surface by directional changes in the vertical direction, for example, where a conveyor changes from an ascending direction to a horizontal direction, according to the present invention, the topside of the rib ends is rounded so that the rib height is reduced toward the outer end. By virtue of the provision of the rounded portions, it is possible to obtain an even surface without the outer ends protruding beyond the ribs of the following chain link and, thus, no variations in height in the chain surface occur by direction changes.

In order to obtain an adjustment of the surface friction so that it may be easier to convey objects sideways from one conveyor to another, the upper edge of the ribs is convex in a transverse direction of the entire rib direction. By virtue of this feature the top side of the conveyor chain link is also less apt to hold dirt and is easier to clean.

According to still further features of the present invention, the entire chain link comprising ribs and a support plate with linking parts and guide parts is pressure die cast in one piece as a solid plastic unit. By virtue of these features, a chain link is provided which can be produced at a competitive price and it is possible, with the same mold, to produce joints made of different plastic material such as Acetal, Acetal with self-lubricating additives, or other suitable plastic materials which can be pressure die cast.

In accordance with additional features of the present invention, the chain link including the support part with linking parts and guide parts is pressure die-cast in one part as a solid plastic unit. By virtue of these features of the invention, a chain link is produced without ribs whereon the ribs are subsequently attached. Therefore, it is possible to produce a chain link proper of a suitable material as described above and the ribs of somemother material such as, for example, rubber, soft plastic, etc. thereby providing a chain with a surface with an increased friction so that objects can be conveyed both on an ascending and descending conveyor without the objects moving relative to the conveyor surface. It is also possible to attach the ribs of a particularly wear-resistant material if highly coarse or abrasive objects are to be conveyed on the conveyor.

Chains made of chain links according to the invention can both by straight running and in curves and turns be used in the hitherto used standard breadths for rails and standard chain wheels. Several chains can run straight ahead next to each other so that there is obtained a wide belt which may perhaps later in the direction of travel be split up in several belts.

BRIEF DESCRIPTION OF THE DRAWINGS

The invention will be further explained in the following with reference to the drawing showing a preferred embodiment of the invention wherein.

DETAILED DESCRIPTION

Figure 1:
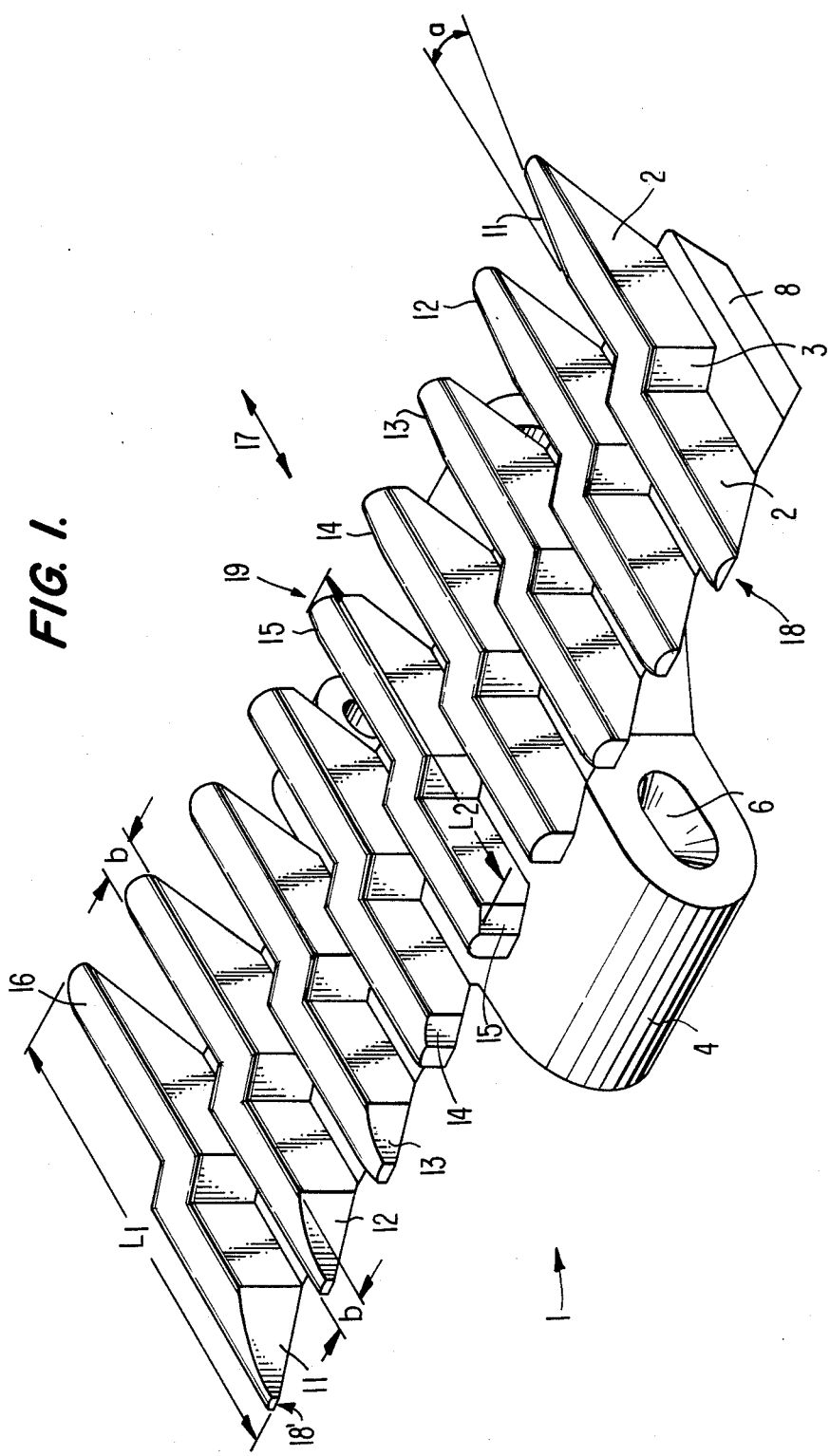
FIG. 1 is an inclined top view of a chain link constructed in accordance with the present invention.
Figure 2:
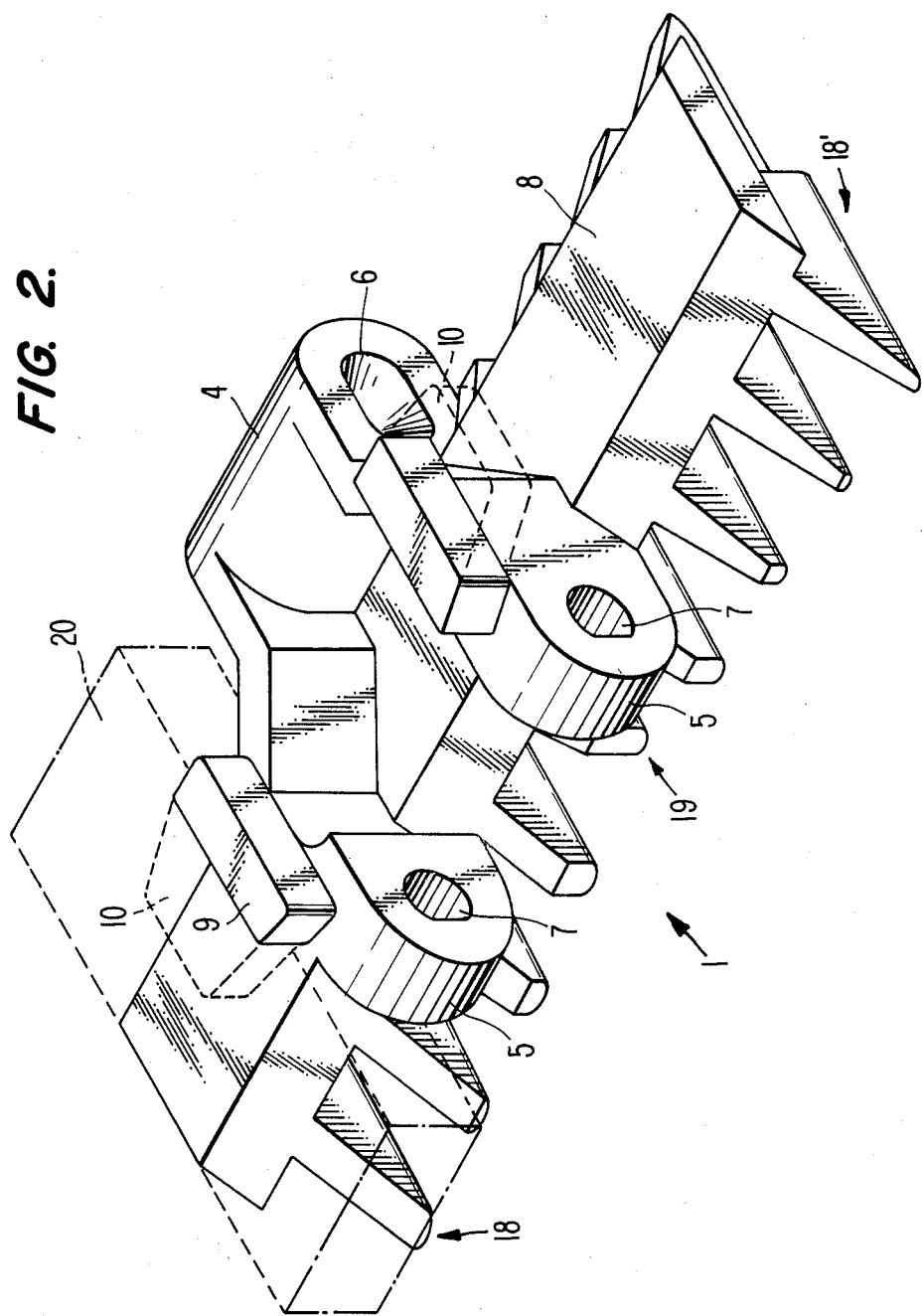
FIG. 2 is an inclined bottom view of the chain link of FIG. 1.

The chain link 1 in FIGS. 1 and 2 is shown with nine ribs, ie. with an unequal number, thus producing a center rib 19 and two outer ribs 18 and 18'. This is only an example of an embodiment of the invention and nothing prevents the chain link from being made in other sizes and with another number of ribs, also an equal number of ribs. In the following description the expression the center rib is used and what is meant here is the rib 19 in chain links having an unequal number of ribs. Where an equal number of ribs is used, what is meant is the two ribs arranged in the center of the row of ribs.

The ribs all consist of two rib parts 2 connected to each other by an offset piece 3 substantially centrally on each rib. This is, however, only an example in that the offset may be displaced relative to the center. The offset 3, however, is generally lying on a straight line dividing the ribs in parts which are substantially equally big.

The chain link shown in FIGS. 1 and 2 is designed as a flexing link chain for conveyors which can be driven in the directions of the double arrow 17, and the individual links of the chain which are all identical have two linking parts 5 with holes 7 for insertion of a fixed bolt (not shown) which is carried through the oblong hole 6 in the rearwardly extending linking part 4 in the following chain link. As apparent to a person skilled in the art the chain links according to the invention arranged as described below and can also be designed as chain links for other types of chain such as, for example, cardan chains.

The chain link shown in the drawing has the ribs arranged integrally with a support plate 8 shown in one part with guide flanges 9 and perhaps in one part with underlying projections 10. In FIG. 2 there is schematically shown a guide rail 20 so that it is seen how the guide flange 9 slides along the guide rail and how the underside of the support plate 8 slides on the guide rail 20 in the usual manner. If the chain link 1 is used for a conveyor having areas with ascending or descending path, the chain link will also have to have underlying projections 10 so that the chain cannot be pulled off the guide rails 20 of the path. The guide rails 20 are designed in a known manner of suitable material depending on the field of application of the conveyor. The guide rails 20 may, for example, be made of metal or plastics and they can be lubricated or self-lubricating.

FIG. 1 shows in details how the ribs according to the invention are designed. The outer ribs 18 or 18' have a total length L1 being greater than that of any one of the ribs arranged therebetween having decreasing lengths towards the centre rib. The decrease from rib to rib from outside towards the center is between 4–8% of the total length and the decrease has been made at both rib ends. The offset 3 is arranged in a straight line perpendicularly to the conveyor direction 17 and all ribs are parallel and parallel to the conveyor direction 17, equally wide and having equally large offset corresponding to the rib breadth. The ribs are arranged at an equal distance from each other which substantially corresponds to a distance twice the rib breadth b.

The outer ribs 18 and 18' are arranged at a distance of approximately b from the outermost edge of the support plate 8 so that several conveyors built up by these chain links can run next to each other and form a wide uniform conveyor belt.

The upper side 16 of the ribs are convex so that there is obtained a surface which is less apt to hold dirt and which is easier to clean.

Moreover, the upper side of the rib ends is rounded so that the rib height decreases at the rib ends.

Finally, at least some of the rib ends have reduced thickness in that the reduction of thickness has been produced by a plane oblique cut at an angle a between 8° and 14°, preferably 11½°. The outer ribs 18 and 18' have the greatest cut and the cut decreases towards the centre and is made onesidedly on the side of the ribs facing the center and solely on half of the ribs in either side as it clearly appears from FIG. 1 of the drawing where the reference numerals 11, 12, 13, 14 and 15 show the onesided cuts. The faces 11–15 are vertical when the surface of the chain link is horizontal.

The chain link shown in FIGS. 1 and 2 for example has the following measures:

L1 approximately 48 mm
L2 approximately 38 mm
b approximately 4 mm
a approximately 11½°
breadth of support plate 8 approximately 115 mm
height of ribs above support plate approximately 9 mm.

Figure 3:
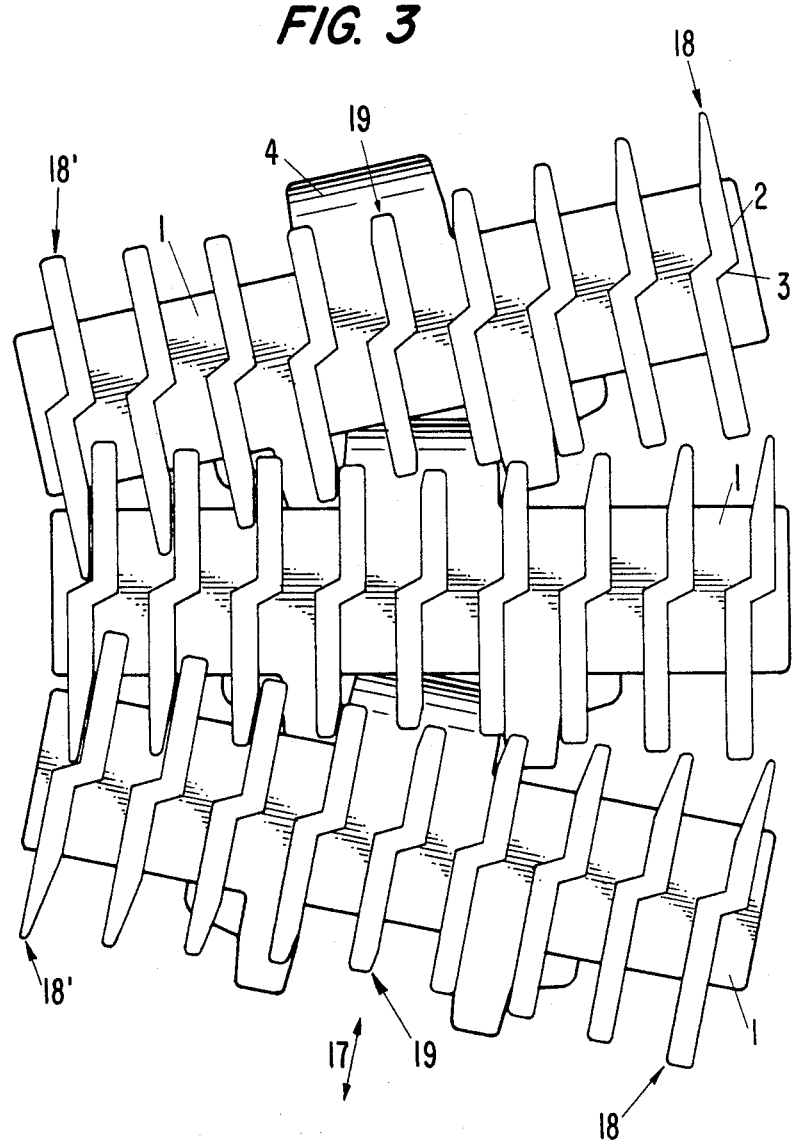
FIG. 3 is a top view of three chain links of a chain being driven by a turning wheel (not shown).

FIG. 3 of the drawing shows three chain links in a conveyor built up by chain links according to the invention where the chain is running over a not shown turning wheel of 190 mm. It clearly appears how the ribs at the bottom of the curve engage each other without touching each other, and how the ribs at the outer end of the curve do not produce any opening whatsoever which is wider than that of the distance between the ribs. The chain links 1 are adapted in such a manner that a chain built up by such chain links may run in both directions as indicated by the double arrow 17.

I claim:

1. Conveyor chain link with ribs on a load-bearing side, upper edges of said ribs forming a bearing surface, the ribs are substantially parallel and extend in a direction of travel of the conveyor, each chain link comprises two mutually offset connected parts being mutually offset whereby the ribs of a following chain link may protrude partly into the spaces between the offset rib parts, and said chain link has linking parts and parts for guiding the chain link in slide rails, characterized in that an overall length of each rib is different so that the outermost ribs have the greatest overall length, and where the length decreases towards the center rib being the shortest rib, and that the rib ends forming a front edge of the chain link and extending from the center rib towards one of the outer ribs have decreasing thickness and the rib ends forming the diagonally opposite edge and extending from the center rib towards the outer rib have a decreasing thickness.

2. Conveyor chain link according to claim 1, characterised in that the distance between neighboring ribs is substantially twice the width of a rib, and the offset between the rib parts is substantially one rib width.

3. Conveyor chain link according to one of claims 1 or 2, characterised in that all of the ribs have substantially the same width (b).

4. Conveyor chain link according to one of claims 1 or 2, characterised in that the difference in length between neighboring ribs is in a range of 4–8% of the rib length.

5. Conveyor chain link according to one of claims 1 or 2, characterized in that a reduction of thickness of the rib ends is made on a side of the ribs facing the center rib by a vertical, plane cut at an angle of between 8°–° relative to a direction of travel of the conveyor chain.

6. Conveyor chain link according to claim 5, characterised in that the angle is 11½°.

7. Conveyor chain link according to one of claims 1 or 2, characterised in that a top side of each of the rib ends is rounded so that the rib height is reduced towards the outer end.

8. Conveyor chain link according to one of claims 1 or 2, characterized in that the upper edge of each of the ribs is convex in a transverse direction in the entire rib length.

9. Conveyor chain link according to one of claims 1 or 2, characterized in that the entire chain link comprising ribs on a support part with linking parts and guide parts is pressure die-cast in one part as a solid plastic unit.

10. Conveyor chain link according to one of claims 1 or 2, characterized in that the chain link comprising a support part with linking parts and guide parts is pressure die-cast in one part as a solid plastic unit.

* * * * *